Fig. 1.

(No Model.)

J. KINDER.
PROCESS OF MAKING SOLID LINK CHAINS.

No. 410,711.  Patented Sept. 10, 1889.

Witnesses:—
D. W. Haywood
C. Lundgren

Inventor:—
Julius Kinder
by his Attorneys
Brown & Griswold (No Model.)　　　　　　　　　　　　　　　　　10 Sheets—Sheet 7.
J. KINDER.
PROCESS OF MAKING SOLID LINK CHAINS.

No. 410,711.　　　　　　　　　　Patented Sept. 10, 1889.

(No Model.) 10 Sheets—Sheet 8.

J. KINDER.
PROCESS OF MAKING SOLID LINK CHAINS.

No. 410,711. Patented Sept. 10, 1889.

Witnesses:—
D. N. Haywood
O. Lundgren

Inventor:—
Julius Kinder
By his Attorneys
Brown & Griswold (No Model.) 10 Sheets—Sheet 9.
J. KINDER.
PROCESS OF MAKING SOLID LINK CHAINS.

No. 410,711. Patented Sept. 10, 1889.

Witnesses:
Inventor:
Julius Kinder
by his Attorneys
Brown & Griswold (No Model.) 10 Sheets—Sheet 10.

J. KINDER.
PROCESS OF MAKING SOLID LINK CHAINS.

No. 410,711. Patented Sept. 10, 1889.

Witnesses:—
D. H. Haywood
O. Sundgren

Inventor.—
Julius Kinder
by his Attorneys
Brown & Griswold

UNITED STATES PATENT OFFICE.

JULIUS KINDER, OF BROOKLYN, NEW YORK.

PROCESS OF MAKING SOLID-LINK CHAINS.

SPECIFICATION forming part of Letters Patent No. 410,711, dated September 10, 1889.

Application filed June 19, 1889. Serial No. 314,826. (No model.)

*To all whom it may concern:*

Be it known that I, JULIUS KINDER, of Brooklyn, in the county of Kings and State of New York, have invented a certain new and useful Improvement in Processes of Making Solid-Link Chains, of which the following is a specification.

My improvement relates to a process of making chains in which the links are solid, or, in other words, links formed without welding or soldering and without breaks.

I will describe in detail a process embodying my improvement and then point out the novel features in claims.

I have illustrated apparatus suitable for carrying out my improvement.

In the accompanying drawings.

I will first describe the means which I employ to feed the rod of metal to be formed into chain into or out of an annealing-furnace preparatory to its being formed into chain.

Figure 1:
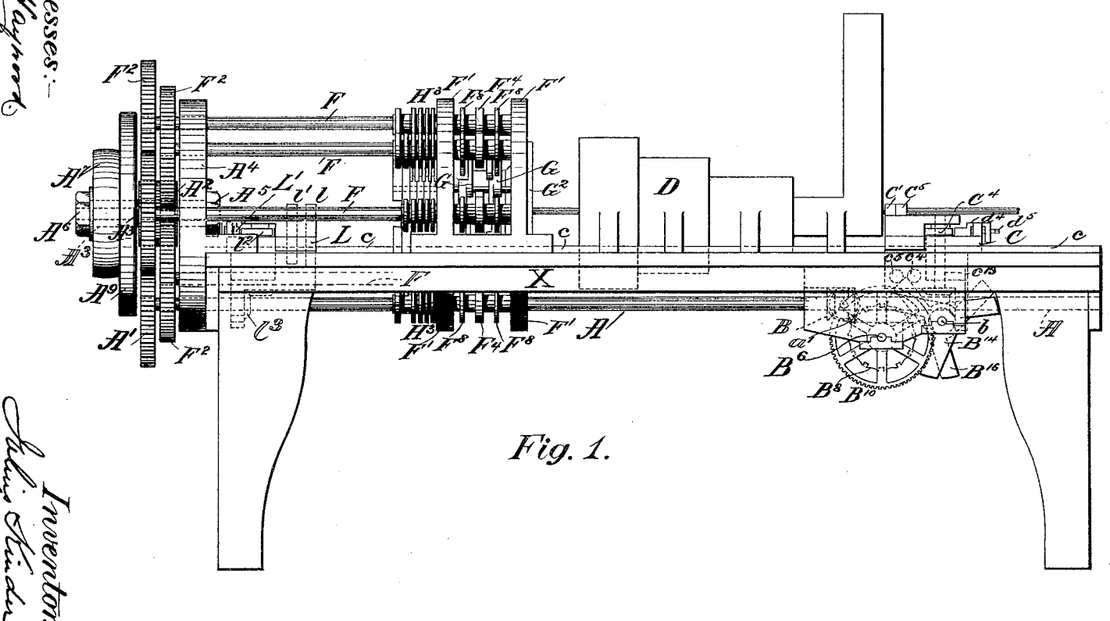
Figure 1 is a side elevation of apparatus embodying my improvement.

Referring first to Fig. 1, A designates a main or driving shaft. This shaft has mounted upon it near one end a gear-wheel A', which gear-wheel derives motion from a gear-wheel $A^2$, mounted upon a shaft $A^3$, which shaft is journaled in an upright portion $A^4$ of the frame. The shaft $A^3$ is hollow, for reasons to be hereinafter described, and has secured upon its ends, as here shown, nuts $A^5\ A^6$, which are also hollow, the former being arranged upon the inside of the portions $A^4$ of the frame and the latter outside a pulley $A^7$, keyed upon the shaft, which pulley derives motion from a belt $A^8$ in the usual manner. Also keyed on the shaft $A^3$ is a fly-wheel $A^9$.

Figure 2:
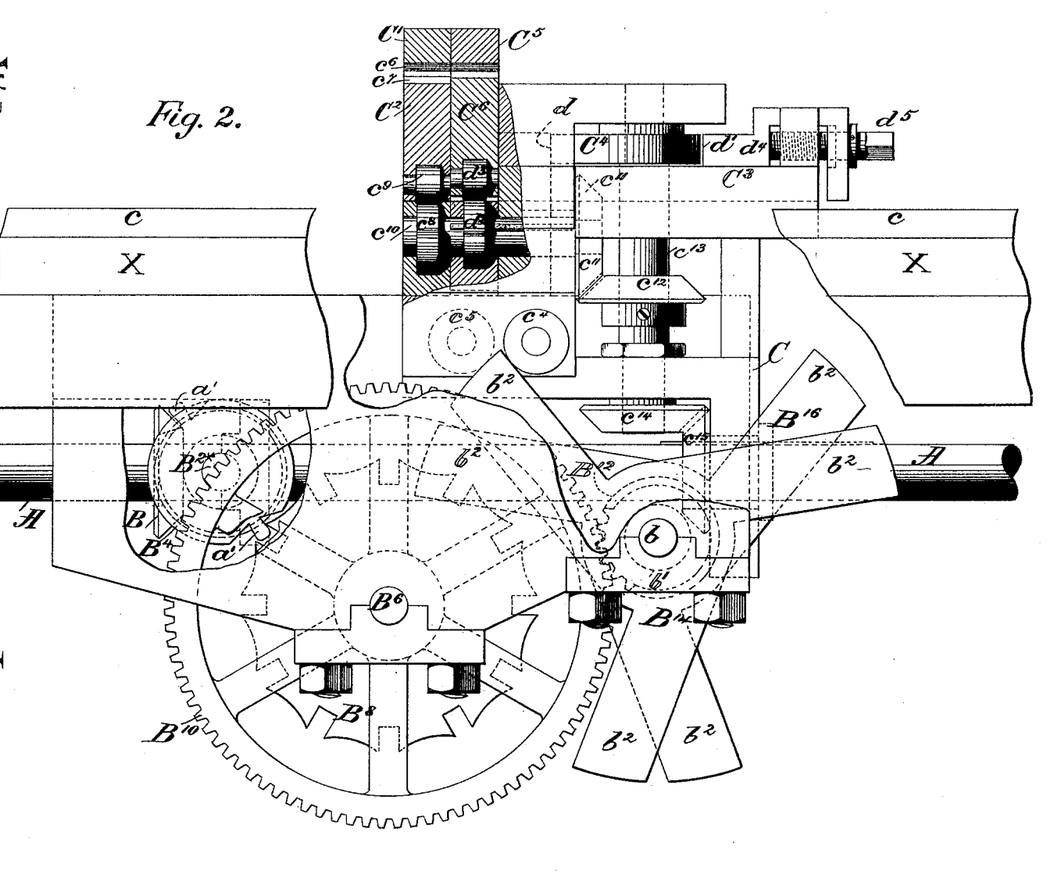
Fig. 2 is a side elevation, partly in section and partly broken away, of the end portion of the apparatus to the right of Fig. 1.
Figure 3:
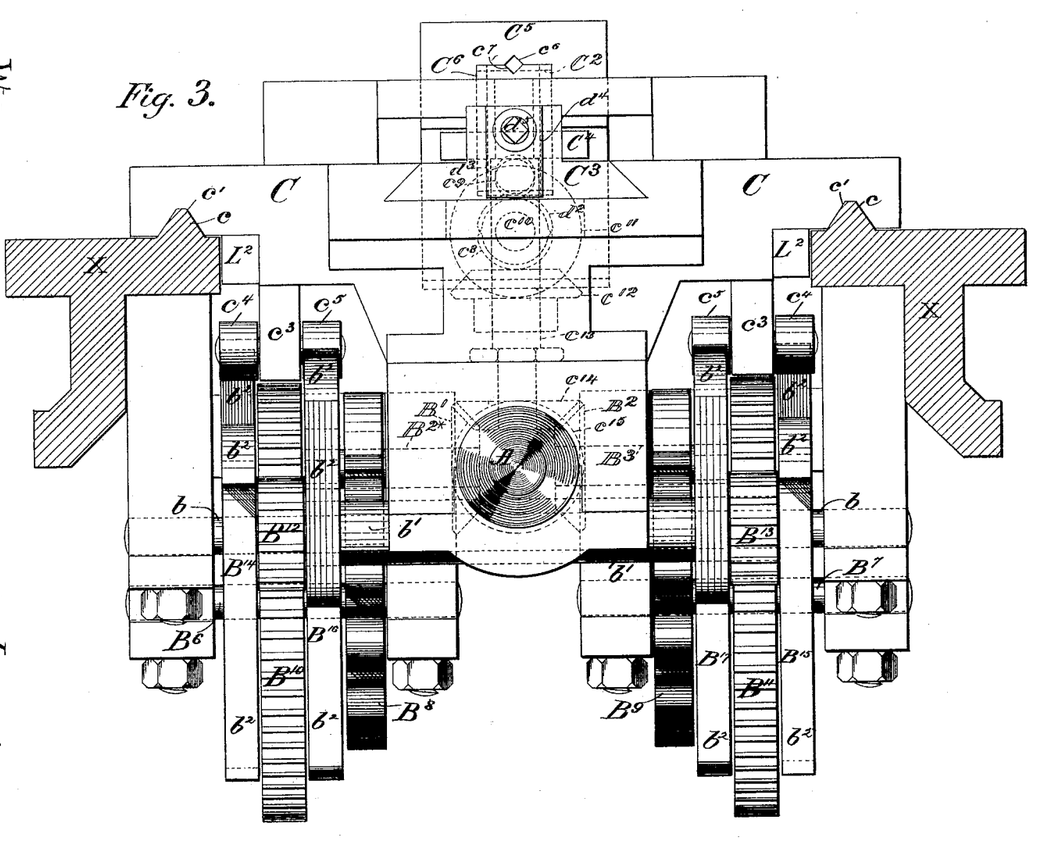
Fig. 3 is an end view of the same.
Figure 4:
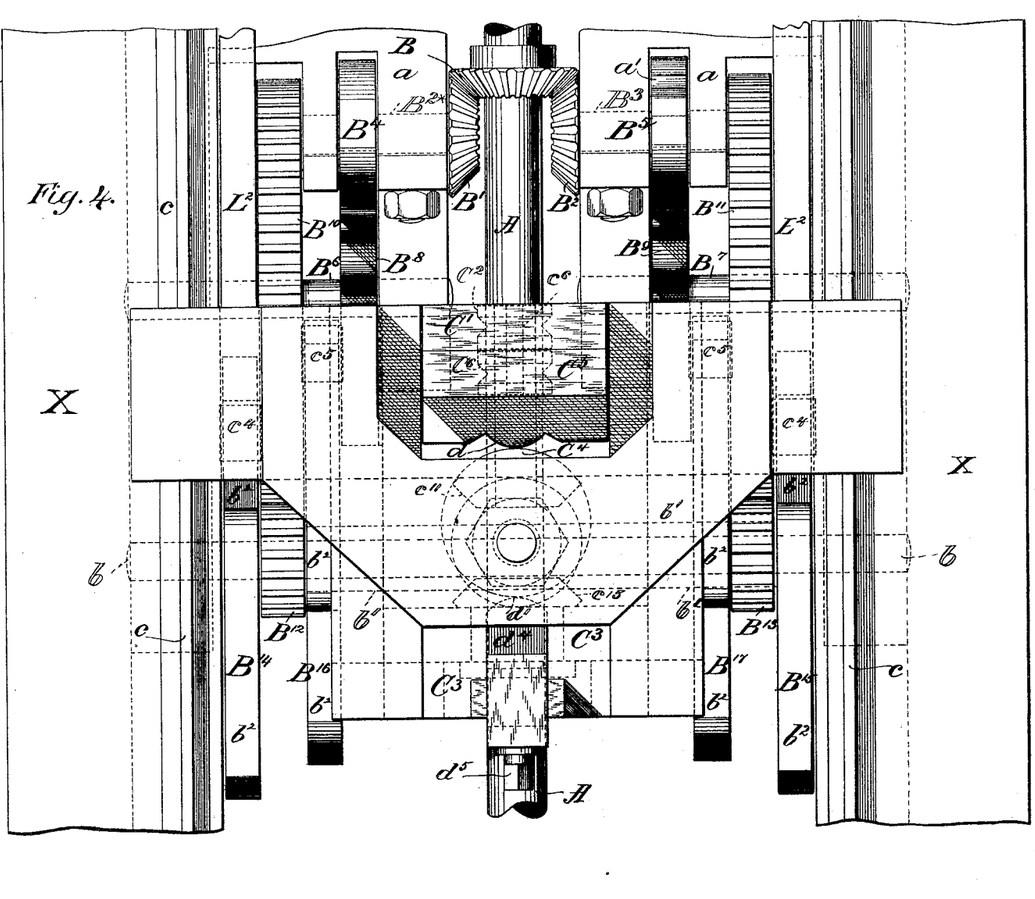
Fig. 4 is a plan or top view of the same.

Referring now more particularly to Figs. 2, 3, and 4, B designates a bevel gear-wheel rigidly keyed upon the shaft A. This gear-wheel meshes with two other bevel gear-wheels B' $B^2$, arranged upon opposite sides of the main shaft A and keyed upon stub-shafts $B^{2*}\ B^3$, journaled in suitable bearings in a portion $a$ of the main frame X of the machine.

Rigidly keyed upon the shafts $B^{2*}\ B^3$ are wheels $B^4\ B^5$. These wheels, as will be more clearly seen by reference to Fig. 2, are provided with a single tooth each.

Upon stub-shafts $B^6\ B^7$, journaled in the main frame of the machine, are mounted notched wheels $B^8\ B^9$, one of which $B^8$ is shown more clearly in Fig. 2. The positions of the wheels $B^8\ B^9$ are such that at each revolution of the wheels $B^4\ B^5$ the teeth $a'$ thereon will engage a notch in the wheels $B^8\ B^9$ and cause a rotation of the latter a distance equivalent to the distance between two of the notches on said wheels, thus causing intermittent rotations of the shafts $B^6\ B^7$, upon which the wheels $B^8\ B^9$ are mounted.

Rigidly keyed upon the shafts $B^6\ B^7$ are gear-wheels $B^{10}\ B^{11}$, one of which $B^{10}$ is more clearly shown in Fig. 2. These gear-wheels mesh with gear-wheels $B^{12}\ B^{13}$. The gear-wheel $B^{12}$ is mounted upon a shaft $b$, extending widthwise of the machine and journaled in the side frames thereof. The gear-wheel $B^{13}$ is keyed upon a shaft $b'$, which is tubular and surrounds the shaft $b$, being free to rotate thereon.

Upon the shaft $b$ are rigidly keyed spiders $B^{14}$ $B^{15}$, and upon the shaft $b'$ are rigidly keyed spiders $B^{16}$ $B^{17}$. Two of these spiders $B^{14}$ $B^{16}$ are shown more clearly in Fig. 2. All of the spiders, as here shown, comprise tangential arms $b^2$. Of course when intermittent motion is imparted to the notched wheels $B^8$ $B^9$ corresponding motion is imparted to the gear-wheels $B^{10}$ $B^{11}$, which gear-wheels in turn transmit a like motion to the gear-wheels $B^{12}$ $B^{13}$, and consequently to the spiders $B^{14}$ $B^{15}$ $B^{16}$ $B^{17}$.

It will be observed that, as the gear-wheels $B'$ $B^2$ are mounted upon opposite sides of the shaft A, motion in reverse direction will be imparted to said gear-wheels by the gear-wheel B. This would result, of course, in causing the mechanisms just described upon opposite sides of the machine to rotate in reverse directions. As, however, the spiders $B^{14}$ $B^{15}$ are mounted upon the shaft $b$, they will rotate in unison and in the same direction, while the spiders $B^{16}$ $B^{17}$, being mounted upon the hollow shaft $b'$, will also rotate in unison and in the same direction, but in a direction contrary to the direction of rotation of the spiders $B^{14}$ $B^{15}$.

The object of the mechanism which has just been described is to impart an intermittent to-and-fro movement to a carriage C, which carriage is shown more clearly in Fig. 3, and is adapted to be slid to and fro upon V-shaped guides $c$, fitting V-way grooves $c'$ in the side edges of the carriage. The V-shaped guides $c$ are formed upon the main frame of the machine and extend lengthwise thereof. Upon the carriage C are downwardly-extending lugs $c^3$. Upon opposite sides of these lugs are mounted rollers $c^4$ $c^5$. The rollers are thus mounted upon studs extending from the lugs $c^3$. The spiders $B^{14}$, &c., during their rotation contact with the rollers $c^4$ $c^5$ and effect a to-and-fro movement of the carriage C. The arms $b^2$ on the spiders $B^{14}$ $B^{15}$ contact with the rollers $c^4$ to move the said carriage rearwardly or away from an annealing-furnace D. The arms $b^2$ on the spiders $B^{16}$ $B^{17}$ contact with the rollers $c^5$ to move said carriage forwardly or toward the furnace.

The wheels $B^4$ $B^5$ are so arranged upon their respective shafts that the teeth $a'$ thereon are at opposite radii upon said wheels, so that the tooth upon only one of the wheels is in engagement with its corresponding notched wheel $B^8$ $B^9$ at a time, and so that rotary motion will be imparted to the wheels $B^8$ $B^9$ at equal distances of time apart.

Each of the spiders I have shown as provided with three arms, and the arms upon the spiders $B^{14}$ $B^{15}$ are so spaced relatively to the arms upon the spiders $B^{16}$ $B^{17}$ that while the former are in contact with the rollers $c^4$ and moving the frame rearwardly the latter will be out of contact with the rollers $c^5$, and vice versa, or, in other words, one of said pairs of spiders, owing to the alternating operation of the wheels $B^8$ $B^9$, is stationary while the other is rotated.

The to-and-fro motion of the carriage C effects a movement of the metal rod to be made into chain first into and out of the annealing-furnace D. During this operation there is also a forward feed of the rod of metal, which is independent of said movement into and out of the furnace. As these two operations co-operate to an extent, I will describe them together, reference being had more particularly to Fig. 2.

Upon the carriage C are two jaws $C'$ $C^2$, the former of which is fixed and the latter movable. The fixed jaw $C'$ is formed upon an upright extending from the carriage C, and, as here shown, is provided with a V-shaped notch $c^6$. The movable jaw $C^2$ slides vertically in suitable guideways in the upright referred to, and is provided with a V-shaped notch $c^7$, which is complementary to the notch $c^6$. Between these jaws the metal rod is gripped both to be fed forwardly and backwardly through the annealing-furnace. Vertical movement is imparted to the jaw $C^2$ by means of a cam $c^8$, mounted upon a shaft $c^{10}$, journaled in the carriage C. Said cam contacts with a roller $c^9$, journaled in the movable jaw $C^2$. The shape of this cam is such that during each rotation it will cause the movable jaw $C^2$ to be elevated to grip the metal rod.

Rotary motion is imparted to the shaft $c^{10}$ by means of a bevel gear-wheel $c^{11}$, mounted on said shaft and meshing with a bevel gear-wheel $c^{12}$, mounted upon an upright shaft $c^{13}$, which shaft $c^{13}$ bears another bevel gear-wheel $c^{14}$, deriving motion from a bevel gear-wheel $c^{15}$ upon the main shaft A. The shaft $c^{13}$ is journaled in the carriage C and moves with the same in its to-and-fro motion. The bevel gear-wheel $c^{15}$ is also mounted in the carriage C, as shown more clearly in Fig. 2, but has a feathered connection with the main shaft A, so that it may rotate freely with said shaft, while at the same time it may slide thereon.

Upon the carriage C is mounted a second carriage $C^3$, which has a to-and-fro motion imparted to it independent of the motion of the carriage C. This motion is effected by means of a cam $C^4$, mounted upon the shaft $c^{13}$ near the upper end of the latter. This cam rotates against bearing-surfaces $d$ $d'$ upon the upper part of the carriage. As it rotates it contacts alternately with said surfaces, so as to move the carriage $C^3$ alternately backward and forward or toward and from the jaws $C'$ $C^2$.

The carriage $C^3$ is provided with two jaws $C^5$ $C^6$, corresponding to the jaws $C'$ $C^2$. The jaw $C^6$ is elevated by a cam $d^2$ upon the shaft $c^{10}$, which cam bears upon a roller $d^3$, journaled in the movable jaw $C^6$. The upward movement of the jaws $C^2$ $C^6$ is, however, alternating—that is to say, when the jaws $C'$ $C^2$ are gripping the metal rod, the jaws $C^5$ $C^6$ have released the rod, and vice versa. This is accomplished by the arrangement of the cams $c^8$ $d^2$ upon the shaft $c^{10}$ relatively to each other. The jaws $C^5$ $C^6$ partake of the independent to-and-fro movement of the carriage $C^3$, and the cam $d^2$ has a sliding feathered connection with the shaft $c^{10}$ to admit of this. The rotation of the shaft $c^{13}$ is so timed and the cam $C^4$ is so placed upon said shaft that when the carriage C has moved to its most forward position and the jaws $C'$ $C^2$ have a grip upon the metal rod to move it into the annealing-furnace the carriage $C^3$ will be moved rearwardly to its independent rearmost position, the jaws $C^5$ $C^6$ being open. When the carriage C reaches its rearmost position and has drawn the metal rod backwardly, the jaws $C'$ $C^2$ are opened. The jaws $C^5$ $C^6$ grip the metal rod and carry it forward independent of the carriage C. The jaws $C'$ $C^2$ then grip the rod and impart to it a still further forward movement. Thus it will be seen that each to-and-fro movement of the carriage C imparts a longitudinal movement to the metal rod through the annealing-furnace D, and at the same time the metal rod is additionally advanced. The length of such additional advance of the rod is dependent upon the length of the links of the chain being made, the extent of such advance being a distance corresponding to the distance between the center of one link and the center of the next link in the corresponding plane.

In order to regulate the length of rod which shall thus be fed forward, I vary the length of throw imparted to the carriage $C^3$ by the cam $C^4$. This I do by providing the carriage $C^3$ with an adjustable section $d^4$, upon which section the bearing-surface $d'$ is formed. This section may be advanced or withdrawn by means of an adjusting-screw $d^5$ engaging a tappet-hole in the carriage $C^3$, and which, when rotated, will cause the desired movement to be imparted to the movable section $d^4$ to bring it nearer to or farther from the cam $C^4$. It is quite clear that as the distance between said cam and the bearing-surface $d'$ is increased or decreased the length of throw imparted to the carriage $C^3$ will be lengthened or shortened.

The annealing-furnace D may be of any suitable or desired kind, and the metal rod is passed to and fro or into and out of the same in the manner described.

Figures 7, 8, 9, 10, 20:
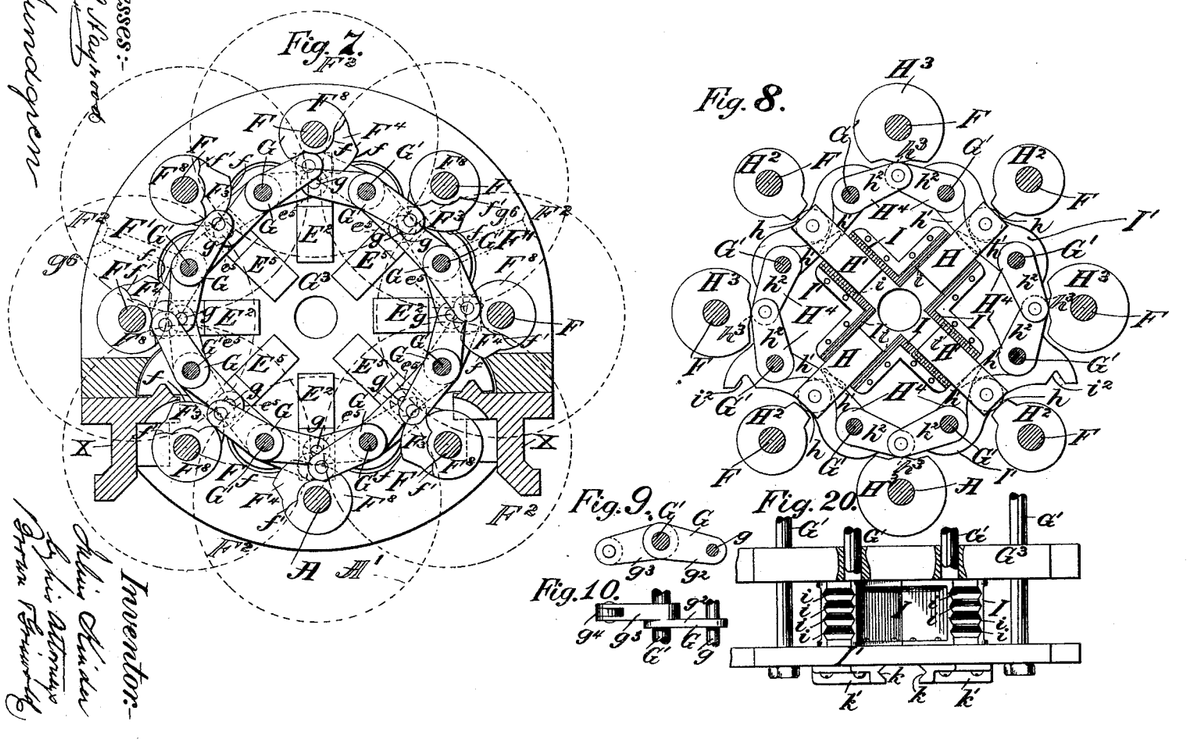
Fig. 7 is an end view of the same.
Fig. 8 is a diagrammatic end view of certain cutters and their operating mechanism.
Fig. 9 is a side view of one of the levers shown in Fig. 7 for operating the dies.
Fig. 10 is an edge view of the same.
Fig. 20 is a plan or top view of guides for the cutters and separators employed.
Figure 11:
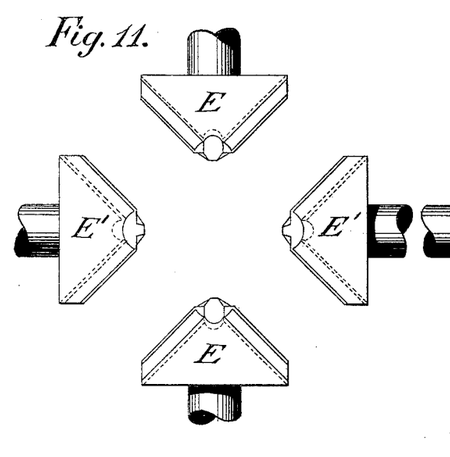
Fig. 11 is a view of the first set of dies employed.
Figure 12:
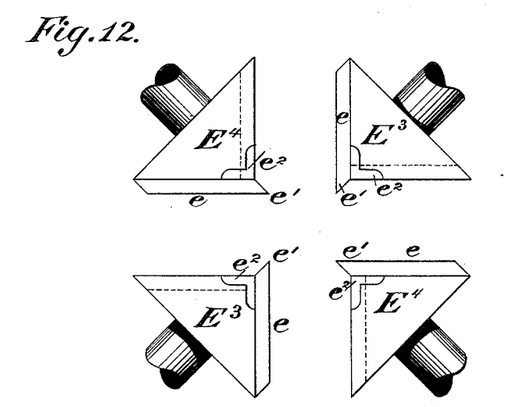
Fig. 12 is a view of certain openers which operate upon the link portions after the dies shown in Fig. 11 have operated thereon.
Figure 13:
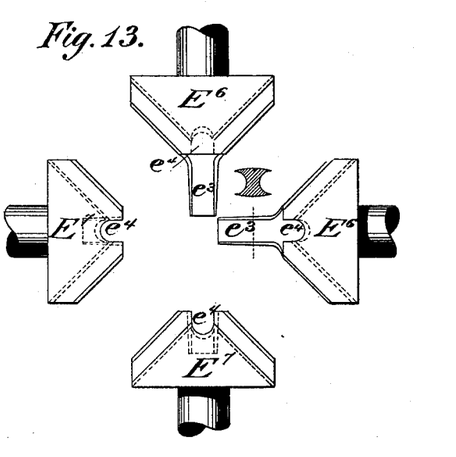
Fig. 13 is a view of a set of openers which operate upon the link portions after the same have been operated upon by the openers shown in Fig. 12.

After leaving the annealing-furnace the metal rod is subjected to the action of a series of dies, openers, and cutters, whereby the same is transformed into a chain. In Fig. 7 I have shown more clearly the die-holders and the first set of openers which I employ, together with means for operating them, and in Figs. 11, 12, and 13 I have shown in detail such dies and openers. The metal rod, after leaving the annealing-furnace D, and while in a heated condition, is first subjected to the action of male and female dies E E′, which dies are mounted in die-holders $E^2$. The die-holders $E^2$ are arranged at angles of ninety degrees, and they thus operate vertically both upon the upper and under side of the metal rod and horizontally upon the sides thereof. One of the sets of dies E or E′ is arranged slightly to the rear of the other of said sets, and when the dies have been caused to act upon the rod they will have impressed the same, as shown at 1 in Figs. 15 and 16, or, in other words, the formation of the dies E E′ is such that they compress the rod in directions at right angles to each other, and approximately form the shape of links upon the rod, indenting the central portion between the sides of the links, as at 1*. After the rod has been compressed in the manner described it is subjected to the action of openers $E^3$ $E^4$, (shown more clearly in Fig. 12,) to which are secured holders $E^5$. The holders $E^5$ are arranged at angles of forty-five degrees and work between the holders $E^2$. The action of the openers $E^3$ $E^4$ is to puncture the metal and to cause openings 2 to be made at the indentations 1* and at the same time to press the side portions of the still unformed links apart. Each of the openers $E^3$ $E^4$ is provided with a beveled rib $e$, terminating at the inner end in a beveled tooth $e'$. When the said bevels are brought together through the link, the teeth $e'$ on the corresponding pairs of openers $E^3$ $E^4$ lap past each other, the result being the formation of the openings 2 and at the same time the spreading apart of the side portions of the link. Not only do the openers $E^3$ $E^4$ perform this operation, but they are also provided with die-surfaces $e^2$, which die-surfaces operate to round off the end portions of the links.

The next step consists in separating the side portions of the link from the end portions of the next adjacent link or links at the sides of said link or links. For this purpose I employ openers $E^6$, which work at angles of ninety degrees and are received into correspondingly-operating complementary parts $E^7$. The openers $E^6$ comprise projections $e^3$, which are tapered and the general shape of which is shown more clearly in cross-section in Fig. 13. When the openers $E^6$ and their complementary parts $E^7$ are brought together, the metal is still further punctured and pressed aside and the links are separated from the end portions of the next adjacent link or links at the sides of said link or links in manner shown more clearly at 3 in Figs. 15 and 16.

It is of course to be understood that the openers $E^3$ operate upon one link while the openers $E^4$ operate upon another link, and that one of the openers $E^6$ and its complementary part $E^7$ also operate upon one link while the other of said openers and its complementary part operate upon another link. Therefore the openers $E^3$ or $E^4$, as the case may be, are arranged one behind the other, and the same is true of the openers $E^6$ and their complementary parts $E^7$. The openers $E^6$ and their complementary parts $E^7$ are provided with die portions $e^4$, which further operate to shape and round off the end portions of the links.

These operations having been performed, the links are in condition to be cut apart—an operation which I will presently describe.

The dies E E' and the openers $E^6$ and their complementary parts $E^7$ are in the present example of my improvement to be all secured in the die-holders $E^2$, while the openers $E^3$ $E^4$ are alone secured in the holders $E^5$.

While apparently the operations just described succeed each other in regular order, they, as a matter of fact, occur simultaneously—that is to say, the dies E E', the openers $E^3$ $E^4$, and the openers $E^6$ and their complementary parts $E^7$ all operate at one and the same time. I prefer, however, that the dies E E' and the openers $E^6$, with their complementary parts $E^7$, should move inward into operative position a little in advance of the openers $E^3$ $E^4$, and I will now proceed to describe the means by which the dies and openers are severally operated.

Figure 5:
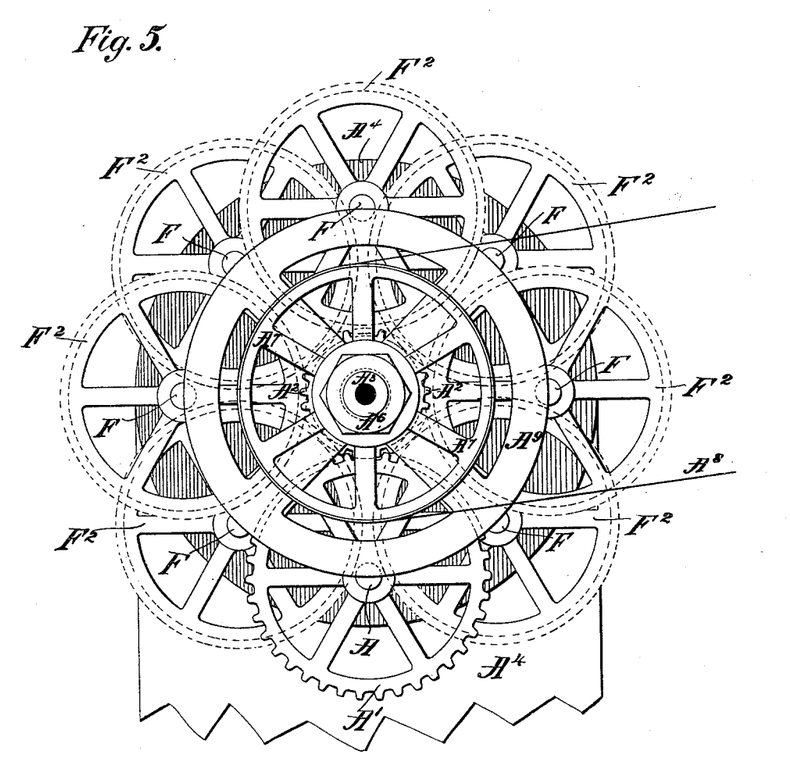
Fig. 5 is an end view to the left of Fig. 1.

F designates a number of shafts, which shafts are mounted near one of their ends in a portion $A^4$ of the frame and near the other of their ends in upright portions F' of the frame. These shafts are all rotary. Rotary motion is imparted to them by gear-wheels $F^2$, keyed upon them outside the portion $A^4$ of the frame, and all mesh with the gear-wheel $A^2$ upon the shaft $A^3$. The gear-wheel $A^2$ has long gear-teeth to admit of this. The arrangement of the gear-wheels $F^2$ is more clearly shown in Fig. 5.

Upon the shafts F and the main shaft A are mounted cams $F^3$ $F^4$ $F^8$. The cams $F^8$ are arranged upon opposite sides of the cams $F^3$ $F^4$, as shown more clearly in Fig. 6, in which figure, however, they are omitted from the central part in order not to obscure the parts beneath. The cams $F^3$ $F^4$ are provided with cam-surfaces $f$ and the cams $F^8$ with cam-surfaces $f'$. All of the cams $F^3$ $F^4$ $F^8$ rotate in unison. The cams $F^4$ operate through their cam-surfaces $f$ to force inwardly the die-holders $E^2$, while the cams $F^3$ operate through their cam-surfaces $f$ to force inwardly the holders $E^5$. The cam-surfaces $f'$ on all the cams $F^8$ operate to effect a withdrawal of the holders $E^2$ $E^5$. These operations are effected as follows: Each of the holders $E^2$ $E^5$ has mounted upon it near its outer end a roller $e^5$. During the rotation of the cams $F^3$ $F^4$ the cam-surfaces $f$ contact with the rollers $e^5$, and thus force the holders $E^2$ $E^5$ inwardly. The cam-surfaces $f$ upon the cams $F^3$ are of greater extent circumferentially than are the cam-surfaces $f$ upon the cams $F^4$. The result of this is, that the holders $E^5$ and their openers are forced inwardly somewhat in advance of the holders $E^2$ and their dies and openers. Consequently the openers $E^3$ $E^4$ have engaged the links before the dies E E' and the openers $E^6$ $E^7$ commence to operate upon the rod. When, however, the openers $E^3$ $E^4$ have engaged the links, the dies and openers E E' $E^6$ $E^7$ move inwardly, and all the dies and openers thus operate simultaneously.

The extent of the cam-surfaces $f$ is such that all the dies and openers simultaneously cease to operate upon the rod and links. It is then necessary to withdraw the holders $E^2$ $E^5$ and their dies and openers. I have shown a means for doing this, consisting of a series of levers G. (Illustrated more clearly in detail in Figs. 9 and 10.) The levers G are arranged side by side in pairs. They are two-armed levers, the arms in this instance being of even length. They are fulcrumed upon a number of rods G', secured in the portions F' of the frame.

Figure 6:
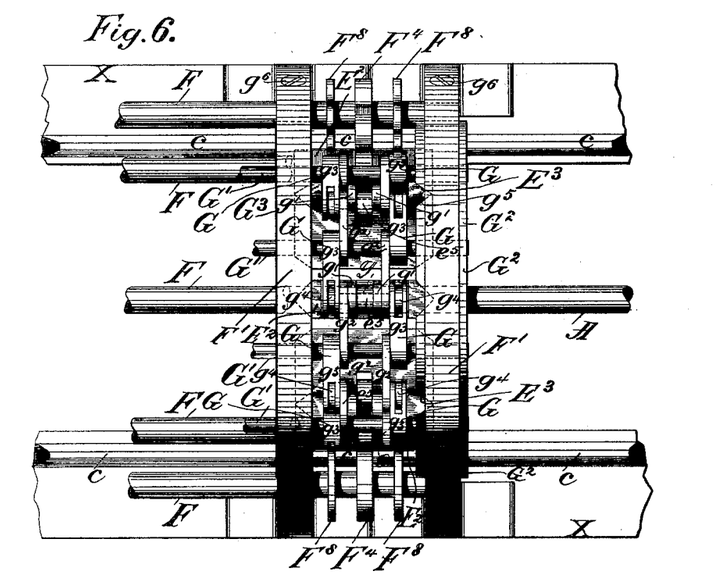
Fig. 6 is a plan or top view of certain die-operating mechanism.

By reference more particularly to Fig. 6 it will be seen that the rollers $e^5$ are mounted upon pins $g$, which pins extend through and beyond lugs $g'$, extending outwardly from the holders $E^2$ $E^5$. These pins, one of which is shown more clearly in Figs. 9 and 10, extend beyond the lugs $g'$ and through one of the arms $g^2$ upon each of the levers. The other arms $g^3$ of the levers bear anti-friction rollers $g^4$. It will thus be seen that one of the arms or $g^2$ of each of the levers is secured to the holders $E^2$ or $E^5$, as the case may be. Consequently, when the cams $F^3$ $F^4$ are moving said holders inwardly, the levers will be rocked upon their fulcrum-rod G' and the arms $g^2$ will be moved inwardly, while the arms $g^3$ will be moved outwardly.

The arrangement of the cams $F^8$ is such relatively to the cams $F^3$ $F^4$ that when the latter have moved the holders $E^2$ $E^5$ inwardly and the dies and openers have performed their work upon the rod of metal said cams $F^8$ will operate upon the rollers $g^4$ on the arms $g^3$ of the levers to move said holders, and consequently the dies and openers, outwardly. Of course at this time the cams $F^3$ $F^4$ have been rotated into such a position that they cease to contact with the rollers $e^5$, and the holders $E^2$ $E^5$ may therefore move freely outwardly. I employ two of the cams $F^8$, one upon each side of each cam $F^3$ $F^4$, in order that the holders $E^2$ $E^5$ may be moved outwardly with uniformity. It is of course understood that the cams $F^8$ in their operation upon the rollers $g^4$ rock the levers G in a different direction from that in which they are rocked by the cams $F^3$ $F^4$.

The holders $E^2$ $E^5$ are guided in their to-and-fro movement in V-shaped guideways $g^5$. (Shown more clearly in Fig. 6.) The ends of the holders $E^2$ $E^5$ are made V-shaped in the cross-section in order to fit these guideways. Said guideways are formed in plates $G^2$ $G^3$, which plates are arranged vertically and within the uprights F'. Normally the plates $G^2$ $G^3$ will be secured to the uprights F' by bolts $g^6$, passing through the uprights F' and into the plates $G^2$ $G^3$.

Figures 15, 16:
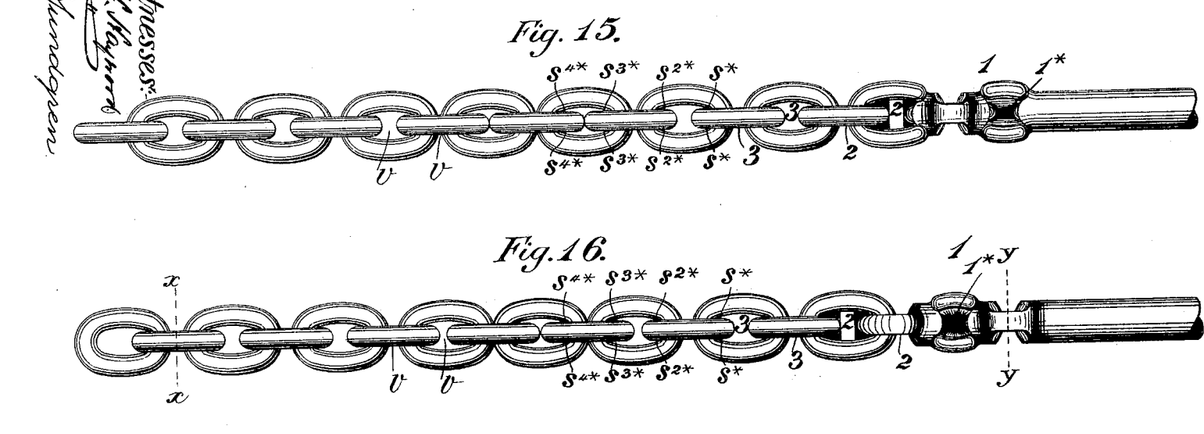
Fig. 15 is a face view showing the various stages through which the rod passes in its manipulation.
Fig. 16 is a view taken at right angles to Fig. 15.
Figure 17:
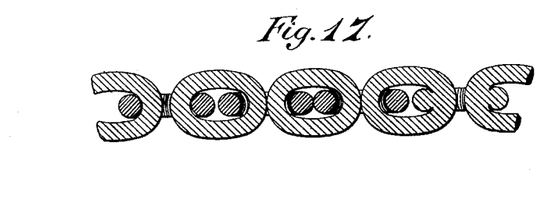
Fig. 17 is a longitudinal section showing the chain in its various stages.
Figure 18:
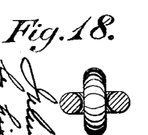
Fig. 18 is a view taken on the line $x\ x$, Fig. 16.
Figure 19:
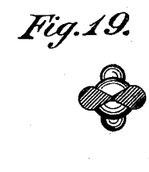
Fig. 19 is a view taken on the line $y\ y$, Fig. 16.

The operations which have been described have brought the rod of metal into the condition shown at 3 in Figs. 15 and 16, in which it has the appearance of a chain, but in which the links are still united together.

The next step consists in severing the link portions from each other, so as to make a chain. To accomplish this I employ a series of cutters. In Fig. 8 I have shown one set of holders for one set of cutters, together with a means for operating the same. H H' designate the cutter-holders, of which there are four separate sets, as shown more clearly in Fig. 1, and in Fig. 20 I have shown in plan guideways in which said cutter-holders move. As the holders of each set are, however, operated alike, I have only illustrated one of the same. These holders are arranged at angles of forty-five degrees, and each is provided near its outer end with a roller $h$. Cams $H^2$, mounted upon certain of the shafts F and rotated thereby, operate when they contact with said rollers to force the holders H H', and consequently the cutters which they carry, inwardly. Upon other of the shafts F and the shaft A are mounted cams $H^3$. Upon the fulcrum-rods G' are fulcrumed levers $H^4$. These levers are two-armed. Each of these levers is provided with an arm $h'$, which extends beneath a roller $h$. The arms $h'$ of adjacent levers extend toward each other, so that two of said arms extend beneath each of said rollers. The other arms or $h^2$ of the levers each bear a roller $h^3$. The rollers $h^3$ occupy such a position that they will be operated upon by the cams $H^3$ during the rotation of the latter. The cams $H^2$ $H^3$ are so placed and formed relatively to each other that when the cams $H^2$, which move the holders H H' inwardly, have ceased to operate upon said holders the cams $H^3$ will then commence their operation, and will so rock the levers $H^4$ as to cause the holders H H' to be moved outwardly by the arms $h'$ on said levers.

Figure 21:
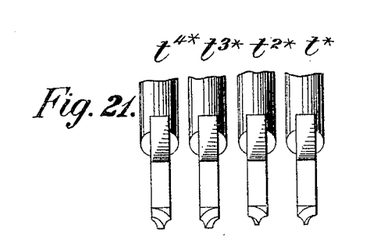
Fig. 21 is a detail view of the cutters.

As previously stated, there are four sets of holders H H', and consequently four sets of cutters, which operate upon the chain to sever the links. These cutters are shown more clearly in Fig. 21.

Referring to Fig. 15, I have shown at $s^*$ the point at which the first set of cutters $t^*$ operate, at $s^{2*}$ the point at which the second set of cutters $t^{2*}$ operate, at $s^{3*}$ the point at which the third set of cutters $t^{3*}$ operate, and at $s^{4*}$ the point at which the fourth set of cutters $t^{4*}$ operate. It will be seen by referring more particularly to Fig. 8 that as the holders H H' move at angles of forty-five degrees the cutters mounted in said holders will move at similar angles, and they will therefore cut form incisions inwardly at angles of forty-five degrees between the links at the points where they are united together. The four cutters of each set $t^*$, &c., operate to make their cuts in unison; but the four sets operate in succession—that is to say, the cutters $t^*$ operate first to make their cut at $s^*$; the cutters $t^{2*}$ next operate to make the cut at $s^{2*}$; the cutters $t^{3*}$ then operate to cut at $s^{3*}$, and, lastly, the cutters $t^{4*}$ operate to cut at $s^{4*}$. Each of the cutters, however, after having made its cut, remains in said cut until the last cuts or those by the cutters $t^{4*}$ have been made. The cutters then all move outwardly in unison. The first cuts or those made by the cutters $t^*$ $t^{2*}$ do not wholly sever the links, but they are wholly severed by the cutters $t^{3*}$ $t^{4*}$. When the cutters have all been moved away from the chain, the latter is moved forward a proper distance in manner heretofore described, and to be hereinafter further described so that the portions $s^*$ $s^{2*}$ will occupy the positions formerly occupied by the portions $s^{3*}$ $s^{4*}$. The next operation of the cutters will then cause a complete severing at what was formerly $s^*$ $s^{2*}$, and new portions $s^*$ $s^{2*}$ will be operated upon.

I have shown the cutters $t^*$ $t^{2*}$ as somewhat shorter than the cutters $t^{3*}$ $t^{4*}$ in order to provide for lesser depths of cuts being made by the first than those made by the last.

Although the sets of cutters $t^*$, &c., operate successively, the duration of time in which they operate is the same as that in which the dies and openers E E', &c., are operating, and the action of the cams $H^3$ is so timed relatively to the cams $F^8$ that when the dies and openers E E', &c., are withdrawn the cutters $t^*$, &c., will be withdrawn at the same time, so that the chain will be simultaneously released by all the dies, openers, and cutters.

Figure 22:
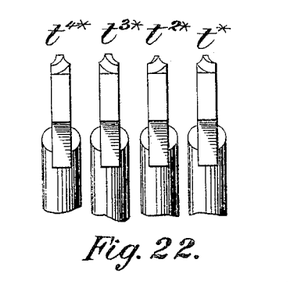
Fig. 22 is a detail view of certain cams for operating the cutters and separators.

In Fig. 22 I have shown diagrammatically the construction of the cams by which the cutters $t^*$, &c., are successively operated. The four cams like $r$ operate the cutters $t^*$, four cams like $r'$ operate the cutters $t^{2*}$, four cams like $r^2$ operate the cutters $t^{3*}$, and four cams like $r^3$ operate the cutters $t^{4*}$. It will be seen that the cam-surfaces on these cams decrease in extent from $r$ to $r^3$, so that the operation of the cutters will be effected in the manner described. It will also be observed that the cam-surfaces so terminate that all the cutter-holders will be released simultaneously, so that they and the cutters may be drawn out together.

The holders H H' for the cutters are adapted to be slid to and fro in slideways $i$. These slideways are, as shown, V-shaped in cross-section, and are formed in angle-plates I, which angle-plates are bolted near one of their ends to the plates $G^3$ and near their other ends to plates I'. The plates I' are in shape similar to the plates $G^2$ $G^3$, and are provided with portions in which are formed V-shaped grooves $i^2$, receiving the V-shaped guides $c$ upon the main frame.

Figure 14:
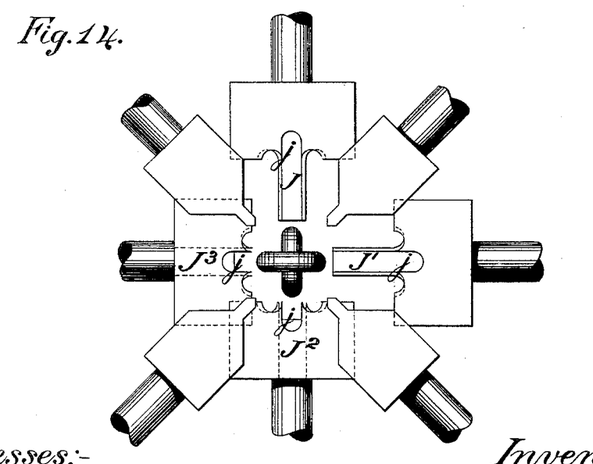
Fig. 14 is a view of a set of cutters and a set of openers or spreaders, the latter operating upon the links after the same have been severed from one another.

The operation of cutting the links apart just described forces the links being acted upon closely together at their ends, as shown in Figs. 15 and 16, and burrs of greater or less extent are formed at the points where the cuts are made through the action of the cutters. It is of course desirable to force the links apart into a normal position and to press down or round off the said burrs. In order to accomplish this, I force wedge-shaped separators J J' (more clearly shown in Fig. 14) inwardly between the ends of the links. These separators act at angles of ninety degrees, or, in other words, at the points $v$ shown upon the chain at Figs. 15 and 16. As the separators are wedge-shaped, when they are forced inwardly between the ends of two adjacent links they not only operate to force said links apart and into proper relative positions, but they also operate to flatten down any burrs which may exist between the links at the points where the cuts are made. The links are by these separators subjected to their last operation in the machine, and the chain is finished. I prefer that these separators should operate alternately, and they operate at the same time that the cuts are being made between the links by the cutters. By an "alternate" movement of the separators I mean that one of the separators shall enter the links previous to the other, but they are withdrawn simultaneously. In Fig. 22 I have shown the cams $r^4 r^5$ of proper conformation to effect this.

As previously stated, the chain is firmly held by the cutters, remaining in engagement therewith until all the cutters have operated. The vertically-extending separator J, which operates upon the vertically-extending links, tends to force all of said links backwardly that are being operated upon by the cutters, and thus facilitates the operation of separating the links. A like function is performed by the separator J', which operates upon the horizontally-extending links. Thus the separators perform the function of separating the already-severed links properly from each other and also assist in the severing operation.

The separators J J' have female portions $J^2 J^3$, which co-operate with them. The female portions $J^2 J^3$ are of such conformity that when brought into contact with the links they grip the links, and thus afford a firm support for the links while being acted upon by the separators, and both the separators J J' and the portions $J^2 J^3$, being provided with die portions $j$, further operate to shape and round off the end portions of the link. These separators and their corresponding portions are shown more clearly in Fig. 14, in which I have also shown one set of cutters to more clearly illustrate the relative direction of movement of the cutters and the separators. The separators are operated like the cutters and the dies and openers—that is to say, their holders are forced inwardly by cams mounted upon the shafts F and are withdrawn by levers mounted upon the rods G'. I have not illustrated these levers and cams except at Fig. 1, for the reason that those shown in Fig. 8 will in every way answer the purpose. The cams which operate them are of such conformation that the separators and the female parts $J^2 J^3$ will be withdrawn from operation upon the chain simultaneously with the cutters, the dies, and the openers.

The separators are guided in their to-and-fro movements in V-shaped guideways $k$, formed in angle-plates $k'$, bolted to the outer side of the plate I'.

The to-and-fro movement of the metal rod and the chain, both in process of manufacture and as completed, occurs at the time when the same are wholly free from the action of the dies, openers, &c.

The movement imparted to the metal rod by the carriage C carries the portion of the rod being operated upon by the dies, openers, &c., back into the annealing-furnace during its movement in one direction and back into position to be operated upon by the dies, openers, &c., during its movement in the other direction. Thus the rod during its process of being transformed into chain is several times reheated before the chain is finally completed.

The chain after leaving the separators J J' passes to a carriage L. The carriage L is similar to the carriage C, and is provided with a carriage L', which corresponds to the carriage $C^3$. Connecting-rods $L^2$ (shown more clearly in Figs. 3 and 4) extend between the carriages C L and unite them together, so that when movement is imparted to the carriage C a corresponding movement both in direction and extent is given to the carriage L.

The chain after leaving the separators is alternately gripped between jaws $l\ l'$, the former on the carriage L and the latter on the carriage L', in manner similar to that described as regards the jaws $C'\ C^2\ C^5\ C^6$, and the carriage L' is driven by a cam $l^2$, deriving motion from a gear-wheel $l^3$ on the main shaft A in manner similar to that described for the carriage $C^3$. Thus the chain is always maintained taut during its to-and-fro movements, and the rod and chain are carried forward perfectly straight.

It is to be observed that in my process no waste of metal occurs in the transforming of the metal rod into chain, excepting possibly such as may be due to abrasion, for the reason that during no portion of the operation is any part of the metal removed or cut away. From a given weight of rod, therefore, a chain of practically the same weight will be formed, while at the same time the links are wholly devoid of welds or joints.

During the operation of the machine which I have illustrated it may be cooled by water in any desired or well-known manner.

By loosening the screws $g^6$ the connection between the plates $G^2\ G^3$ and the portions F' of the frame may be severed, and as the plate I' is secured to the plate $G^3$ said plates $G^2$, $G^3$, and I', together with all the dies, openers, cutters, and separators, may be removed from the machine at pleasure. In order to accomplish this, of course all the various cams which operate the said dies, openers, &c., must be moved into a position where they will not contact with the same.

What I claim as my invention, and desire to secure by Letters Patent, is—

1. The process of making a solid-link chain, consisting in taking a rod of metal and first indenting it by pressure on opposite sides and also in directions at right angles to each other to form portions on the bar of the approximate shape of chain-links, afterward puncturing and opening out by pressing aside the metal between the ends of said link-shaped portions and at the sides of said ends, further shaping by pressure said link-shaped portions into the form of links, and severing said link-shaped portions from each other by incisions in the metal between them, substantially as specified.

2. The process of making a solid-link chain, consisting in taking a rod of metal and first indenting it by pressure upon opposite sides and also in direction at right angles to each other to form portions on the bar of the approximate shape of chain-links, afterward puncturing and opening out by pressing aside the metal between the ends of said link-shaped portions and at the sides of said ends, further shaping said link-shaped portions into the form of links by pressure and severing said link-shaped portions from each other by incisions in the metal between them, the links being ultimately forced into proper relative position by pressure applied between their adjacent ends after they have been pressed toward each other during the operation of severing, substantially as specified.

JULIUS KINDER.

Witnesses:
FREDK. HAYNES,
GEO. BARRY.